United States Patent [19]
Bayle et al.

[11] Patent Number: 5,514,198
[45] Date of Patent: May 7, 1996

[54] METHOD OF FORMING A LOW-DENSITY INSULATING THERMOSTRUCTURAL COMPOSITE MATERIAL

[75] Inventors: Colette Bayle; Nicolas Marceau, both of Saint Medard En Jalles, France

[73] Assignee: Aerospatiale-Societe Nationale Industrielle, Paris, France

[21] Appl. No.: 305,744

[22] Filed: Sep. 14, 1994

Related U.S. Application Data

[63] Continuation of Ser. No. 978,541, Nov. 19, 1992, abandoned.

[30] Foreign Application Priority Data

Nov. 26, 1991 [FR] France .................................. 91 14551

[51] Int. Cl.⁶ .................................................. C03B 23/20
[52] U.S. Cl. .................................................. 65/42; 65/36
[58] Field of Search .......................... 65/36, 42; 156/89; 428/428, 312.6

[56] References Cited

U.S. PATENT DOCUMENTS 3,184,371  5/1965  Seidl .
4,554,197  11/1985  Chyung et al. ........................ 428/428
4,798,758  1/1989  Nagano et al. ....................... 428/319.1
4,833,015  5/1989  Furuuchi et al. ..................... 428/312.6
4,992,318  2/1991  Gadkaree ............................... 428/428

FOREIGN PATENT DOCUMENTS 196949  10/1986  European Pat. Off. .
404632  12/1990  European Pat. Off. .
2655327  6/1991  France .

Primary Examiner—Michael W. Ball
Assistant Examiner—Richard Crispino
Attorney, Agent, or Firm—Nikaido, Marmelstein, Murray & Oram

[57] ABSTRACT

The material is composed of previously machined glass/SiC skins which is an expanded glass foam cake forming a sandwich structure which is obtained by placing on a rigid support the elements of the sandwich structure, applying a uniformly distributed mechanical pressure to the structure and by heating to structure under air at atmospheric pressure according to a specific heating/cooling cycle aircraft. One application of this product is to load-bearing structures.

8 Claims, 1 Drawing Sheet

METHOD OF FORMING A LOW-DENSITY INSULATING THERMOSTRUCTURAL COMPOSITE MATERIAL

This application is a continuation of application Ser. No. 07/978,541 filed Nov. 19, 1992, now abandoned

FIELD OF THE INVENTION

The invention concerns a low-density insulating thermostructural composite material and more specifically a SiC/glass/glass foam sandwich, as well as its method of production.

BACKGROUND OF THE INVENTION

Currently, there are unidirectional or bidirectional composite structural materials formed from SiC fibres and a glass mould and obtained by impregnating a fibrous preform with the aid of a bonding agent containing the elements required to obtain the desired vitreous composition followed by drying of the impregnated preform. Dried prepregs are then stacked and rendered integral with one another by means of moderate heating so as to obtain large composites with mono or bidirectional reinforcement, this preform being finally densified during a hot compression stage at a preferred temperature of between 1000° and 1200° C., as described in the document FR.A. 2 648 806. There are also vitroceramic compositions obtained via the sol-gel method and having a low coefficient of thermic dilation and able to withstand considerable and rapid temperature variations. The document FR-A 2 655 327 describes a vitroceramic composition whose principal compounds are $SiO_2$, $Al_2 O_3$ and $LiO_2$ or MgO obtained via the sol-gel method from silicon and aluminium alcoholates and lithium or magnesium compounds, said composition mainly being in the form of a solid ceramic solutions whose low coefficient of dilation favors the formation of composite materials having good thermomechanical characteristics.

Owing to their inherent quality, the above-mentioned structural materials can advantageously be applied in the spatial and aeronautical fields. However, they are not high-performing as regards sound and thermic insulation. Thermic and sound insulating materials do nevertheless exist and these include glass foams with an aluminosilicate base and an expanded structure, as described in the document FR-A 2 578 828. This aluminosilicate, which is at least partially crystallized, results from oxidation of aluminum and silicon with (which of course contains nitrogen) resulting in obtaining an expanded alumino-silicate substance with closed pores containing nitrogen. This material is waterproof and has good resistance to chemical agents and constitutes a good thermic insulator. On the other hand, it only has mediocre structural qualities.

However, none of these products combines all the qualities required to be able to embody high-resistant and light bearing structures suitable for the production of panels, especially for aircraft and space vehicles which strictly need to have high-performance characteristics and at the same time possess sound characteristics relating to mechanical resistance, thermic insulation, sound insulation and with chemical neutrality, all these characteristics being also required for use at high temperatures, namely up to about 1000° C.

Indeed, it would be possible to combine composite structural materials and thermic and sound insulating materials and thus obtain a sandwich structure having the sought-after characteristics. For example, by lining the walls with a mould of densified SiC/glass skins and introducing inside a mixture of glass powder and aluminium nitride as described in the document FR-A 2 578 828, an expanded glass foam linked to the walls would be obtained following an appropriate thermic treatment. The expansion of the foam exerts pressure on the walls of the mould which favors the linking with the SiC/glass skins. This apparently seductive solution does nevertheless have drawbacks causing the Applicant to seek another material and method. These drawbacks are mainly due to the difficulties encountered in manipulating the aluminium nitride and glass powder mixture to embody the moulds, even when this involves obtaining flat plates, and to have the glass foam expand so as to obtain thin and extremely slender pieces.

SUMMARY OF THE INVENTION

The object of the invention is to thus provide a low-density thermostructural composite material formed from silicon carbide fibers with a glass mould and a glass foam constituted by an alternation of previously machined glass mould skins and cakes of expanded glass foam which form a sandwich structure obtained where there is cross migration of the chemical elements contained in the glass of the various layers at the level of their interfaces.

The main object of the invention also concerns a method for embodying an insulating thermostructural composite material and consists of:
- disposing a glass mould skin on a rigid support,
- placing on said skin an expanded glass foam whose shape and thickness correspond to those of the final sought-after piece,
- placing all the above on a rigid counterform,
- applying to the unit thus formed a uniformly distributed mechanical pressure,
- placing the unit in an oven and subjecting it to heating under air at atmospheric pressure according to a specific temperature rise cycle followed by cooling, and
- withdrawing the elements kept under pressure. The specific heating cycle mainly consists of:
- ensuring the rise of ambient temperature beyond the temperature, at which transition to the vitreous range occurs.
- maintaining a heating stage for a specific period at this maximum temperature,
- ensuring slow cooling down to 500° C.,
- finally, carrying out fast cooling from 500° C. down to ambient temperature by opening the oven.

Advantageously, the rates of rise and fall of temperature are about 500° C./hour and the heating stage at maximum temperature is about 15 minutes.

BRIEF DESCRIPTION OF THE DRAWINGS

Other particular characteristics and advantages of the invention shall appear more readily from a reading of the following description with reference to the accompanying drawings on which.

DETAILED DESCRIPTION OF THE PREFERRED EMBODIMENTS

Figure 1:
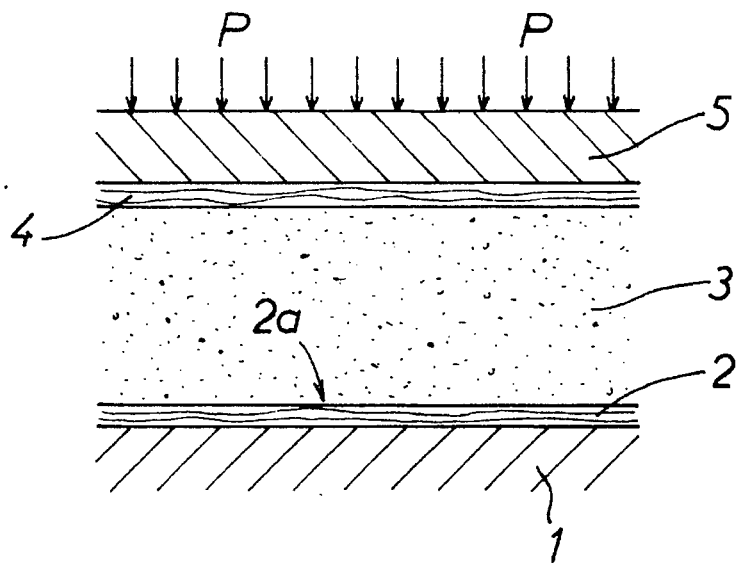
FIG. 1 is a diagrammatic cutaway view of the production of a thermostructural composite material.

FIG. 1 shows the sandwich structure obtained by the method. Disposed on a rigid support 1 is a densified glass/SiC skin 2, i.e. a first composite obtained by known means and which has undergone prior surface conditioning providing it with a good surface condition. This conditioning has been carried out on the upper face 2a of the skin 2. Placed above the latter to form a first unit, is an expanded glass foam 3 whose shape and thickness correspond to the shape of the final sought-after piece less the thickness of the skins. This foam is surface-machined and the porosities are open. The foam 3 then has disposed thereon a skin 4 whose nature is identical to the first skin, and is also conditioned on its lower face. A rigid counterform 5 is placed on the first unit to form a second unit, mechanical pressure P being applied uniformly and evenly to the second unit. Then this second unit that is the skins 2 and 4 on either side of the foam 3 held between the support 1 and the counterform 5, held under pressure is placed in an oven and a second composite is formed of the first composite and the foam by heating under air at atmospheric pressure according to the next specific cycle :

Rise of oven temperature beyond the vitreous temperature at which transition to the vitreous range occurs at a rate of climb of 500° C./hour, Followed by a stage of 15 minutes at maximum temperature, Slow cooling down to 500° C. (for example, reduction of 500° C./hour), Finally, fast cooling from 500° C. to ambient temperature by opening of the oven.

At the end of this cycle, it is possible to remove the elements maintained under pressure and separate the second composite is from the second unit as the low density thermostructural composite.

The pressure, temperature and time parameters are adjusted so as to avoid damaging the foam and the glass/SiC composite. It shall be observed that the temperature reached in the oven is between 800° and 900° C. for a sandwich structure composed of standard SiC/glass skins.

Figure 2:
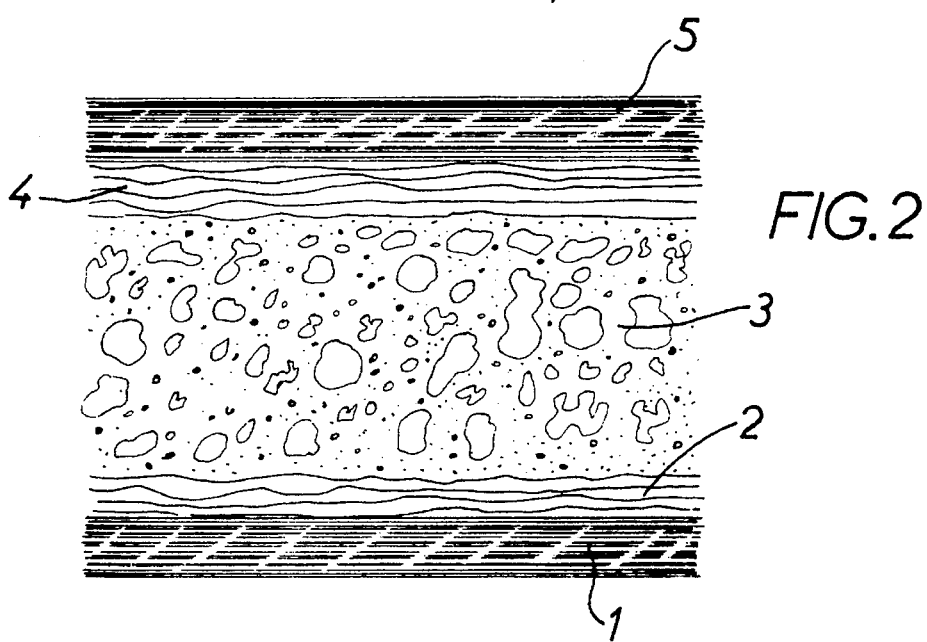
FIG. 2 is a cutaway view of a glass foam-glass/Sic sandwich structure obtained by the method.

By means of this method, an excellent link is obtained between the glass foam 3 and the skins 2 and 4. FIG. 2 shows a sandwich obtained via this method which is constituted by an alternation of SiC/glass skins and an expanded glass foam cake in which the three layers are clearly visible. FIG. 2 also shows the presence of the rigid support 1 and the counterform 5. Thus, this FIG. 2 depicts the product made according to this invention as it leaves the oven before it is separated from the support 1 and the counterform 5. The maximum temperature at which the system is held as can be seen, is greater than the temperature at which transition to the vitreous range occurs of the materials present, allows for a migration of the chemical elements contained in the various layers at the level of their interfaces. Holding for 15 minutes is adequate and necessary so that the temperature of the unit is homogeneous and so as to guarantee the canopy link without deteriorating by collapsing of the foam. The foam may be heated to a temperature of about 50% above its vitreous transition temperature without the risk of being damaged. It can be clearly seen that the expanded foam 3 and its pores are perfectly linked to the fibered skin 4.

Figure 3:
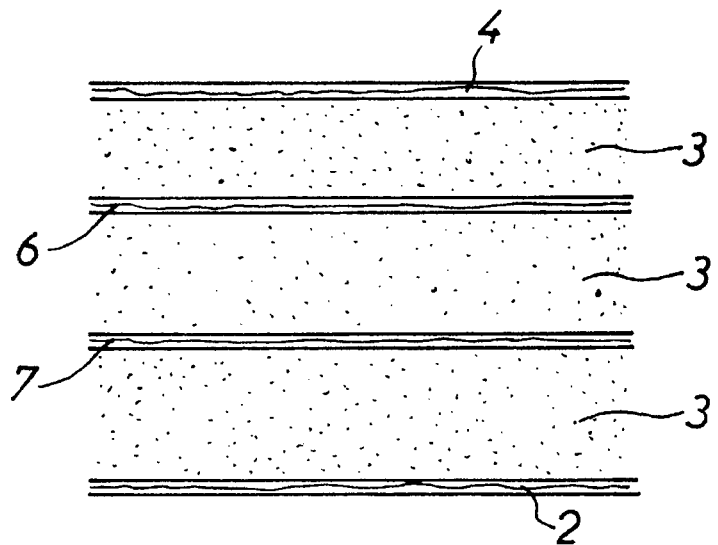
FIG. 3 is an embodiment variant of FIG. 1.

FIG. 3 shows another shape of the piece obtained, without the rigid support or the counterform being depicted, in which several intermediate skins 6, 7 are provided in addition to the external skins 2, 4. Inserted between these skins are several portions of expanded glass foam 3 with the desired shapes and thicknesses which, along with the skins, form a multiple sandwich Compression and oven heating of such a composite will be under conditions sufficient to bond all the elements together.

The invention is not merely limited to the previously described pieces with parallel and flat faces, but covers all other possible shapes. The supports are thus adapted to the sought-after shapes, just like the counterforms which support the pressurized elements. The invention is also no longer limited to SiC/glass skins as any other skin with a glass mould may be envisaged.

The panels embodied with the aid of these sandwich structures possesses rigidity comparable to that of an alveolar metallic panel, but with in addition a guarantee of resistance at higher temperatures. It is also possible to also use them for aircraft and space vehicle load-bearing structures, as well as for fire-resistant elements with high thermomechanical resistance.

What is claimed is:

1. Method for producing an insulating, low density thermostructural composite material comprising:

placing a premade first composite, comprising SiC fibers and glass, on a rigid support, placing, on said first composite, an expanded foam layer, comprising glass, whose shape corresponds to the shape of said low density thermostructural composite material and whose thickness together with the thickness of said first composite corresponds to the thickness of said low density thermostructural composite material, to form a first unit;

placing a rigid counterform on said first unit opposite to said rigid support to form a second unit;

applying a uniformly distributed mechanical pressure to said second unit through said rigid support and said rigid counterform;

placing said second unit under said mechanical pressure in an oven and heating it under air at atmospheric pressure to a temperature, and for a time sufficient to bond said first composite to said foam layer and cause migration of chemical elements from each of said foam layer and said first composite into the other across an interface therebetween to form a fusion bonded second composite of said first composite and said foam layer, but insufficient to substantially damage said glass/SiC fibers first composite or said expanded foam layer;

removing the second unit, held under said mechanical pressure, from said oven;

cooling said second unit under said mechanical pressure until said second composite becomes substantially rigid; and separating said second composite article, consisting essentially of said bonded first composite and foam layer, from said second unit as said insulating, low density thermostructural composite material.

2. Production method according to claim 1, comprising:

alternatingly disposing layers of said first composite and multiple layers of said foam to form said first unit; and maintaining said second unit in said oven at said temperature for a time sufficient to cause said elements to migrate from said layers of foam and said first composite into adjacent regions across respective interfaces sufficient to bond such respective layers of first composites and foam together.

3. Production method according to claims 1 or 2, wherein said heating and cooling are accomplished in a cycle comprising:

raising the temperature in said oven to higher than the temperature at which said foam layer and said first composite transition to the vitreous range maintaining said oven at said temperature higher than said transition temperature for a time sufficient to cause said migration;

slowly cooling said second unit down to 500° C.; and then fast cooling said second unit from 500° C. to ambient temperature.

4. Production method according to claim 3, wherein the steps of raising the temperature and slowly cooling said second unit are performed at a rate of about 500° C./hour.

5. Production method according to claim 3, including maintaining said maximum temperature for about 15 minutes.

6. Production method according to claim 1 including providing an additional premade glass first composite layer between said foam layer and said rigid counterform.

7. Production method according to claim 1 wherein said skin layer consists essentially of glass and SiC fibers and wherein said temperature of said oven is about 800° to 900° C.

8. Production method according to claim 1 wherein said foam layer consists essentially of glass.

\* \* \* \* \*